United States Patent [19]

Biglione et al.

[11] Patent Number: 4,866,124
[45] Date of Patent: Sep. 12, 1989

[54] BLENDS BASED ON VINYL-AROMATIC POLYMERS ENDOWED WITH IMPROVED CHARACTERISTICS OF CHEMICAL RESISTANCE

[75] Inventors: Gianfranco Biglione; Gian C. Fasulo, both of Mantova, Italy

[73] Assignee: Montedipe S.p.A., Milan, Italy

[21] Appl. No.: 151,935

[22] Filed: Feb. 3, 1988

[30] Foreign Application Priority Data

Feb. 4, 1987 [IT] Italy .............................. 19248 A/87

[51] Int. Cl.$^4$ ............................................. C08L 69/00
[52] U.S. Cl. ...................................... 525/67; 525/146
[58] Field of Search ........................... 525/67, 146, 439

[56] References Cited

U.S. PATENT DOCUMENTS 4,257,937 3/1981 Cohen et al. ......................... 525/67
4,704,430 11/1987 Freitag et al. ........................ 525/67
4,710,534 12/1987 Liu ....................................... 524/411

Primary Examiner—Theodore E. Pertilla
Attorney, Agent, or Firm—Stevens, Davis, Miller & Mosher

[57] ABSTRACT

Blends based on vinyl-aromatic polymers endowed with improved characteristics of chemical resistance, comprising:

from 10% to 90% by weight of an impact-resistant styrenic copolymer containing from 8 to 30% by weight of an ethylenically unsaturated nitrile, from 15% to 45% by weight of an olefinic elastomer, and from 77% to 25% by weight of a vinyl-aromatic monomer, and from 90% to 10% by weight of a mixture of aromatic group containing resins constituted by from 70% to 99% by weight of an aromatic polycarbonate and from 30% to 1% by weight of an aromatic polyester.

12 Claims, No Drawings

BLENDS BASED ON VINYL-AROMATIC POLYMERS ENDOWED WITH IMPROVED CHARACTERISTICS OF CHEMICAL RESISTANCE

DESCRIPTION OF THE INVENTION

The present invention relates to a blend based on vinyl-aromatic polymers endowed with improved characteristics of chemical resistance which are particularly suitable to be heat-transformed into shaped bodies by extrusion.

From Italian application No. 20362 A/82, filed on March 24, 1982, it is known that blends based on vinyl-aromatic polymers are suitable for use in the industrial sectors for the production by molding and extrusion of articles for the technical application sectors. This Italian application disclosed in particular blends comprising:

from 20 to 80% by weight, with respect to the blend, of a modified vinyl-aromatic polymer containing from 5 to 15% by weight of an ethylenically unsaturated nitrile; and from 80 to 20% by weight, with respect to the blend, of at least one resin containing aromatic groups selected from aromatic polycarbonates and aromatic polyesters.

However, it has been found that such blends or mixtures, even if they are satisfactory as far as mechanical and thermal properties are concerned, are not completely satisfactory as far as their resistance to external agents is concerned.

In fact, and for example in the case of particularly stringent requirements from the automotive industry, it is necessary that the obtained shaped articles have:

a high resistance to external agents, in terms of resistance to color variation with time and of mechanical and thermal characteristics; and a high chemical resistance to the action of gasoline.

The blends described in the above Italian application do not provide all the above properties required in the automotive sector.

It has now been discovered that if the vinyl-aromatic copolymer, containing an ethylenically unsaturated nitrile and made impact- or shock-resistant by an olefinic elastomer, is blended with an aromatic polycarbonate and with an aromatic polyester, blends having improved characteristics of resistance to external agents and improved chemical resistance are obtained, without modifying and, preferably, improving the other mechanical and thermal properties of the foregoing copolymer.

The present invention is therefore directed to blends endowed with characteristics of improved resistance to external and chemical agents, comprising:

from 10% to 90% by weight of an impact-resistant styrenic copolymer containing from 8% to 30% by weight of an ethylenically unsaturated nitrile, from 15% to 45% by weight of an olefinic elastomer, and from 77% to 25% by weight of a vinyl-aromatic monomer, and from 90% to 10% by weight of a mixture of resins containing aromatic groups constituted by from 70% to 99% by weight of an aromatic polycarbonate and from 30% to 1% by weight of an aromatic polyester.

Particularly preferred are blends consisting of:

from 25% to 55% by weight of an impact-resistant styrenic copolymer of the above type;

from 30% to 60% by weight of an aromatic polycarbonate; and from 10% to 15% by weight of an aromatic polyester the sum of these three components being equal to 100%.

In the impact-resistant styrenic copolymer, the elastomeric component (which is the support on which the acrylonitrile and the styrene are partly grafted and partly mechanically adhered as acrylonitrile-styrene copolymer) is an ethylene/alpha olefines/cyclic or acylic having an unconjugated double bond polyene terpolymer with a low unsaturation. Said terpolymer has an ethylene content between 20% and 80% by moles, a polyene content between 0.1% and 20% by moles, and the remainder being constituted by an alpha-olefinic monomer.

Examples of terpolymers of low unsaturation are ethylene/propylene/cyclic or acyclic polyene terpolymers; or ethylene/butene-1/cyclic or acyclic polyenes; the polyene being selected from the group comprising pentadiene-1,4; hexadiene-1,4; hexadiene-1,5; heptadiene-1,5; dodecatriene-1,7,9; methyl-heptadiene-1,5; 6-alkylene-norbornene; norbornadiene-2,5; 2-alkylnorbornadiene-2,5; cyclooctadiene-1,5; dicyclopentadiene; tetrahydroindene; 5-methyl-tetrahydroindene, etc.

The term vinyl-aromatic monomer comprises compounds having the formula:

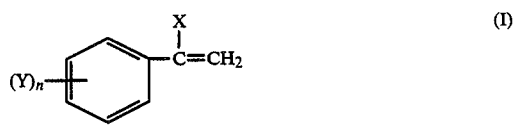

in which X represents hydrogen or an alkyl radical having from 1 to 4 carbon atoms; Y represents hydrogen, a halogen, or an alkyl radical having from 1 to 4 carbon atoms; and n is zero or an integer from 1 to 5.

Examples of vinyl-aromatic compounds having the formula (I) are: styrene; methyl styrene; mono-, di-, tri-, tetra-, and penta-chloro-styrene and the respective alpha-methyl-styrenes; styrenes alkylated in the nucleus and the respective alpha-methyl-styrenes such as ortho- and para-methyl-styrenes and ortho- and para-ethyl-styrenes; and ortho- and para-alpha-methylstyrenes. These monomers may be used along or in mixture with each other.

As ethylenically unsaturated nitrile is to be understood, firstly and preferably, acrylonitrile; even if other acrylic monomers such as methyacrylonitrile and alkyl-esters of acrylic or methacrylic acid, may be used.

According to the present invention, the aromatic polycarbonates used in the blends of the present invention may be homopolymers or copolymers based on, fo example, one or more of the following bisphenols: di-hydroxy-diphenyls, bis-(hydroxy-phenyl)-alkanes, bis-(hydroxyphenyl)-cycloalkanes, bis-(hydroxy-phenyl)-sulphides, bis(hydroxy-phenyl)-ethers, bis-(hydroxy-phenyl)-ketones, bis-(hydroxy-phenyl)-sulphoxides, bis-(hydroxy-phenyl)-sulphones, alpha-alpha-bis-(hydroxy-phenyl)-di-isopropyl-benzenes, and also their derivatives alkylated or halogenated in the nucleus. These and other di-hydroxy-aromatic compounds are well known per se and are described in the literature.

Preferred bisphenols are those corresponding to the formula:

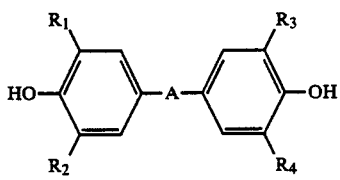

in which $R_1$, $R_2$, $R_3$ and $R_4$ each represents hydrogen or an alkyl radical containing from 1 to 4 carbon atoms or a halogen, and A represents —O—, —CO—, —SO$_2$—, an alkylene radical containing from 2 to 10 carbon atoms, an alkylidene radical containing from 2 to 10 carbon atoms, a cyclo-alkylene radical containing from 5 to 15 carbon atoms, a cyclo-alkylidene radical containing rom 5 to 15 carbon atoms, or the radical:

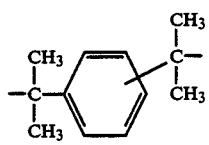

Particularly preferred bisphenols are, for example, 2,2-bis-(4-hydroxy-phenyl)-propane; 2,2-bis-(3,5-dimethyl-4-hydroxy-phenyl)-propane; 2,2-bis-(3,5-dichloro-4-hydroxyphenyl)propane; 2,2-bis-(3,5-dibromo-4-hydroxy-phenyl)-propane, and 1,1-bis-(4-hydroxy-phenyl)-cyclohexane.

Particularly preferred polycarbonates are those based on one or more of the above-mentioned bisphenols. More particularly, polycarbonates based on 2,2-bis-(4-hydroxy-phenyl)-propane or on 2,2-bis-(3,5-di-methyl-4-hydroxy-phenyl)-propane, alone or in mixture with each other or with one of the above reported bisphenols, are especially preferred.

Polycarbonates containing in the chain units derived from terephthalic and/or isophthalic acid may also be used. The aromatic polycarbonates may be produced according to per se known processes, for example according to the trans-esterification process in the molten state from bisphenols and diphenylcarbonate, or according to the two-phase interfacial process from bisphenol and phosgene, as described in H. Schnell "Chemistry and Physics of Polycarbonates", Interscience Publishers, N.Y., 1964.

The aromatic polycarbonates may also be of branched type obtained by incorporation of a small quantity, preferably between 0.05 and 2 moles per cent, of compounds having three or more functional groups, particularly those having three or more hydroxylic phenolic groups.

The aromatic polycarbonates used in the blends of the present invention have an average molecular weight of at least 10,000, more specifically from 10,000 to 200,000, and preferably between 20,000 and 80,000 as determined by the measurement of relative viscosity in CH$_2$Cl$_2$ at 25° C. and at a concentration of 0.5% by weight.

The aromatic polycarbonates containing the recurring units (II) are per se well known in the art and are available on the market from different producers; for example, General Electric Company, Pittsfield, Massachusetts, U.S.A., by the trade name "LEXAN"; ANIC S. Donato Milanese (Milano) by the trade name "SINVET", etc.

The aromatic polyesters which may be used in the blends of the present invention are obtained by polymerization of a glycol having the formula:

$$HO-(CH_2)_n-OH \qquad (IV)$$

in which n is an integer from 2 to 10 with a dicarboxylic acid of the formula:

$$HOOC-R_1-B-R_2-COOH \qquad (V)$$

in which $R_1$ and $R_2$ each represents —(CH$_2$)$_m$— where m is zero or an integer from 1 to 4 and B is a divalent aromatic radical represented by:

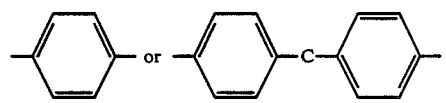

wherein C may be:
—(—CH$_2$)$_p$—; —(CH$_2$)$_p$ —CO—(CH$_2$)$_p$—; —(CH$_2$)$_p$—O—(CH$_2$)$_p$—; —O—(CH$_2$)$_q$—O—;

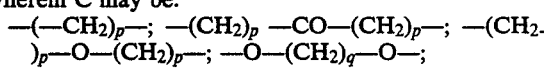

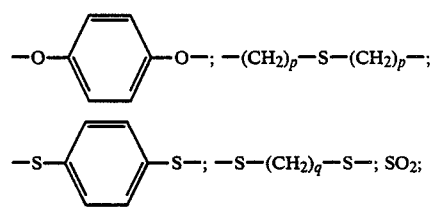

where p may be zero or an integer from 1 to 5; and q is an integer from 1 to 5.

Preferred aromatic polyesters are poly(ethylene-terephthalate), poly(propylene-terephthalate), poly(butylene-terephthalate), and poly(ethylene-2,2'-diphenoxy-ethane-4,4'-dicarboxylate). These polyesters have preferably a molecular weight between 10,000 and 80,000 and may be produced according to per se known techniques of polycondensation or poly-trans-esterification.

The blends of the present invention may be prepared in any known type of mixer, for instance, single-screw of double-screw extruders, Banbury mixers, mixing rollers, etc.

Fillers, glass fibers, pigments and other additives such as stabilizers, anti-flame agents, lubricants, anti-static agents, pigments, etc., may be added during the step of mixing the components.

The present polymeric blends show a set of properties that are on the whole significantly better than those of the single components. For this reason these polymeric blends find use in applications requiring high tenacity, high heat-dimensional stability, good hydrolysis-resistance and easy workability, combined with a high resistance to external agents and high chemical resistance to the action of gasoline. These blends thus find an application in the automotive industry, in electronics, and, generally, in technical products of various kinds.

The following illustrative but not limiting examples are given in order still better to comprehend the present invention and to put it in practice. In the examples all parts are expressed by weight, unless indicated otherwise.

The properties of the blends of the present invention have been tested on test pieces molded by injection, by using the following methods:

1. The Vicat softening point procedure was determined, according to the Standard ISO 306, in oil at 5 Kg.
2. The IZOD impact strength was determined at 23° C. according to the Standard ASTM D. 256, by using test pieces of size ½"×⅛" (1.27 cm×0.32 cm).
3. The tensile strength was determined according to the Standard ASTM D. 638.
4. The tests for resistance to gasoline were carried out on test pieces subjected to creep in a tensile test, maintaining their central part, for a 40 mm stretch, in contact with gasoline. For this purpose, a glass container containing gasoline was fixed, by means of a rubber gasket, to the lower end of the vertically arranged test piece, in correspondence with its wider dimension. The test piece was subjected to a load of 200 Kg/cm² and the time necessary for it to rupture was measured.

Examples 1–4

Into a single screw extruder BANDERA TR 45 having a length/diameter ratio=30, there were fed, in the proportions recorded in the following table, a blend constituted by:

A. A styrenic copolymer (AES) containing 24% by weight of acrylonitrile, 30% by weight of ethylene-propylene-diene rubber, and 46% of styrene; and B. A mixture constituted by polycarbonate "SINVET 221" and polyethylene-terephthalate, in the amounts recorded in the table.

The mixture was extruded at a temperature of 260° C. and the obtained granules were injection-molded in order to provide test pieces for the mechanical-physical tests.

The properties of the blends measured on the thus-obtained test pieces were recorded in the following table:

TABLE

| | | Examples | | | |
|---|---|---|---|---|---|
| | | 1 | 2 | 3 | 4 |
| Composition | | | | | |
| Styrenic copolymer (AES) | | 50 | 50 | 37.5 | 20 |
| Polycarbonate | | 50 | 45 | 50 | 50 |
| Polyethylene-terephthalate | | | 5 | 12.5 | 30 |
| Properties | Units | | | | |
| Resilience IZOD with indent | J/m | 565 | 527 | 507 | 138 |
| Tensile Strength: | | | | | |
| Yield Stress | N/mm² | 36.5 | 37 | 39.5 | 41.5 |
| Elongation | % | 46 | 55 | 76 | 106 |
| Modulus of elasticity | N/mm² | 1950 | 1990 | 2050 | 2100 |
| VICAT B | °C. | 109 | 109 | 110 | 109 |
| Chemical Resistance to gasoline | min. | 5 | 11 | 30 | 10 |

The polycarbonate "SINVET 221" is a trademark for a product sold by the firm ANIC of S. DONATO MILANESE (Milano).

What is claimed is:

1. Blends based on vinyl-aromatic polymers endowed with improved chemical resistance characteristics, consisting essentially of:
    from 10% to 90% by weight of an impact-resistant styrenic copolymer containing from 8% to 30% by weight of an ethylenically unsaturated nitrile, from 15% to 45% by weight of an olefinic elastomer, and from 77% to 25% by weight of a vinyl-aromatic monomer, and
    from 90% to 10% by weight of a mixture of resins containing aromatic groups constituted by from 70% to 99% by weight of an aromatic polycarbonate and from 30% to 1% by weight of an aromatic polyester.

2. Blends according to claim 1, comprising:
    from 25% to 55% by weight of an impactresistant styrenic copolymer as defined in claim 1;
    from 30% to 60% by weight of an aromatic polycarbonate; and
    from 10% to 15% by weight of an aromatic polyester, the sum of these three components being equal to 100%.

3. Blends according to claim 1 or 2 characterized in that the olefinic elastomer is constituted by a low unsaturated terpolymer of ethylene/propylene/cyclic or acyclic polyene having unconjugated double bonds.

4. Blends according to claim 3, characterized in that the terpolymer is constituted by from 20% to 80% by moles of ethylene, from 0.1 to 20% by moles of polyene, and the remaining part being constituted by an alpha-olefinic monomer.

5. Blends according to claims 1 or 2, wherein the vinyl-aromatic monomer has the formula (I):

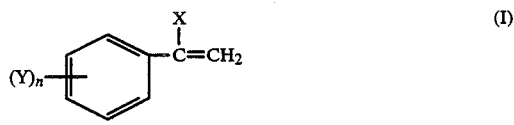

wherein:
    X represents hydrogen or an alkyl radical having from 1 to 4 carbon atoms;
    Y represents hydrogen, a halogen or an alkyl radical having from 1 to 4 carbon atoms, and
    n is 0 or an integer between 1 and 5.

6. Blends according to claim 1 or 2, characterized in that the ethylenically unsaturated copolymerized nitrile is acrylonitrile.

7. Blends according to claim 1 or 2, wherein the aromatic polycarbonate is obtained from a bis-phenol having the formula:

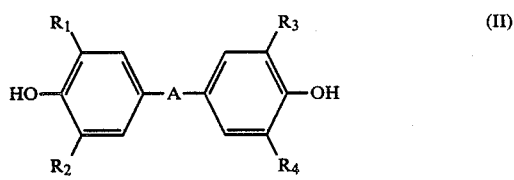

in which $R_1$, $R_2$, $R_3$ and $R_4$ each represents hydrogen or an alkyl radical containing from 1 to 4 carbon atoms or a halogen and A represents —O—, —CO—, —SO₂—, an alkylene radical containing from 2 to 10 carbon atoms, an alkylidene radical containing from 2 to 10 carbon atoms, a cyclo-alkylene radical containing from 5 to 15 carbon atoms, a cyclo-alkylidene radical containing from 5 to 15 carbon atoms, or the radical:

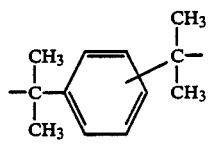 (III)

8. Blends according to claim 7, wherein the aromatic polycarbonate has an average molecular weight higher than 10,000.

9. Blends according to claim 7, wherein the aromatic polycarbonate has an average molecular weight between 10,000 and 200,000.

10. Blends according to claim 1 or 2, wherein the aromatic polyester is obtained by polymerization of a glycol having the formula:

 (IV)

in which n is an integer from 2 to 10, with a dicarboxylic acid of the formula:

HOOC-$R_1$—B—$R_2$—COOH  (V) in which $R_1$ and $R_2$ each represents —$(CH_2)_m$— where m is zero or an integer from 1 to 4, and B is a divalent aromatic radical represented by:

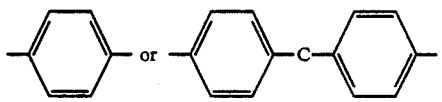

wherein C may be:

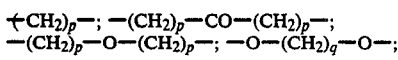

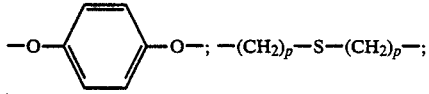

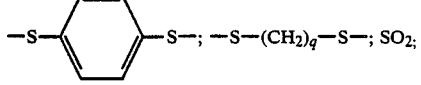

where p may be zero or an integer from 1 to 5; and q is an integer from 1 to 5.

11. Blends according to claim 10, wherein the aromatic polyester has a molecular weight between 10,000 and 80,000.

12. Blends according to claim 1 or 2, further comprising stabilizers, plasticizers, anti-flame agents, anti-static agents, pigments, lubricants.

* * * * *